(12) United States Patent  (10) Patent No.: US 6,903,750 B2
Sidwell  (45) Date of Patent: Jun. 7, 2005

(54) CONTROLLING AN OUTPUT DEVICE

(75) Inventor: Nathan Mackenzie Sidwell, Bristol (GB)

(73) Assignee: STMicroelectronics Limited, Almondsbury Bristol (GB)

( * ) Notice: Subject to any disclaimer, the term of this patent is extended or adjusted under 35 U.S.C. 154(b) by 0 days.

(21) Appl. No.: 10/117,308

(22) Filed: Apr. 5, 2002

(65) Prior Publication Data

US 2003/0071817 A1 Apr. 17, 2003

Related U.S. Application Data

(63) Continuation of application No. 09/994,383, filed on Nov. 26, 2001, now abandoned, which is a continuation of application No. 09/870,371, filed on May 30, 2001, now abandoned, which is a continuation of application No. 09/690,335, filed on Oct. 17, 2000, now abandoned, which is a continuation of application No. 09/507,398, filed on Feb. 18, 2000, now abandoned, which is a continuation of application No. 09/359,220, filed on Jul. 22, 1999, now abandoned, which is a continuation of application No. 09/211,281, filed on Dec. 14, 1998, now abandoned.

(30) Foreign Application Priority Data

Dec. 23, 1997 (GB) .............................. 9727240

(51) Int. Cl.[7] ................................. G09G 5/00
(52) U.S. Cl. ...................... 345/611; 345/559
(58) Field of Search ............... 345/222, 283, 345/559, 611, 626, 418, 442, 443; 382/222, 283

(56) References Cited

U.S. PATENT DOCUMENTS 5,301,265 A * 4/1994 Itoh ............................. 345/428

5,375,196 A  12/1994 Vatti et al.

FOREIGN PATENT DOCUMENTS

EP  0 314 289  5/1989
EP  0 348 631  1/1990

OTHER PUBLICATIONS

"A Memory Controller with an Integrated Graphics Processor"; Watkins, Roth, Hsieh, Radke, Hejna, Byung, Tom; Oct. 1993; Proceeding of 1993 IEEE International Conference on Computer Design: VLSI in Computers and Processors, ICCD '93, P: 324–338.*

Newman, William M., "Principles of Interactive Computer Graphics", McGraw–Hill Inc., 1979, pp 22–27.*

Standard Search Report dated Jun. 24,, 1997, issued by the European Patent Office.

G. Alia et al., Fast Hardware Graphic Generators of Curve Families, Computers and Graphics, vol. 10, No. 1, 1986, pp. 27–36, XP 0006529272.

* cited by examiner

Primary Examiner—Matthew C. Bella
Assistant Examiner—Alysa Brautigam
(74) Attorney, Agent, or Firm—Lisa K. Jorgenson; James H. Morris; Wolf, Greenfield & Sacks, P.C.

(57) ABSTRACT

A method for generating a series of digitized control values for an output device to represent a continuous series of source data, comprising the steps of: storing in a single register a first digitized control value and an indication of deviation between that value and the source data; and repeatedly adding an increment to the register to generate a further digitized control value and simultaneously update the indication of deviation.

12 Claims, 5 Drawing Sheets

FIG. 1

FIG. 2
PROCESSOR & MEMORY

FIG. 3

| SYMBOL | OPERATION |
|---|---|
| V | ARITHMETIC LOGIC UNIT. COMBINES THE TWO SOURCE VALUES IN SOME MANNER TO PRODUCE A RESULT. |
| R[3] R[2] R[1] R[0] | BUFFER. THIS PARTICULAR ONE HAS AN INPUT WHICH IS UNSEPARATED AND FOUR SEPERATED OUTPUTS, EACH TAKING ONE QUARTER OF THE INPUT SIGNALS, IT ALSO HAS AN OUTPUT ENABLE INPUT. |

CONTROLLING AN OUTPUT DEVICE

BACKGROUND OF THE INVENTION

This invention relates to methods and apparatus for controlling output devices.

Most output devices can only output information in digitised form, and therefore cannot display continuous data precisely. For instance, video display units (VDUs) commonly display information using an array of pixels at discrete positions. When continuous data is to be displayed on such a device there is a need to convert the data to a digitised format. This is usually done by choosing digitised values that correspond closely to the continuous data.

Figure 1:
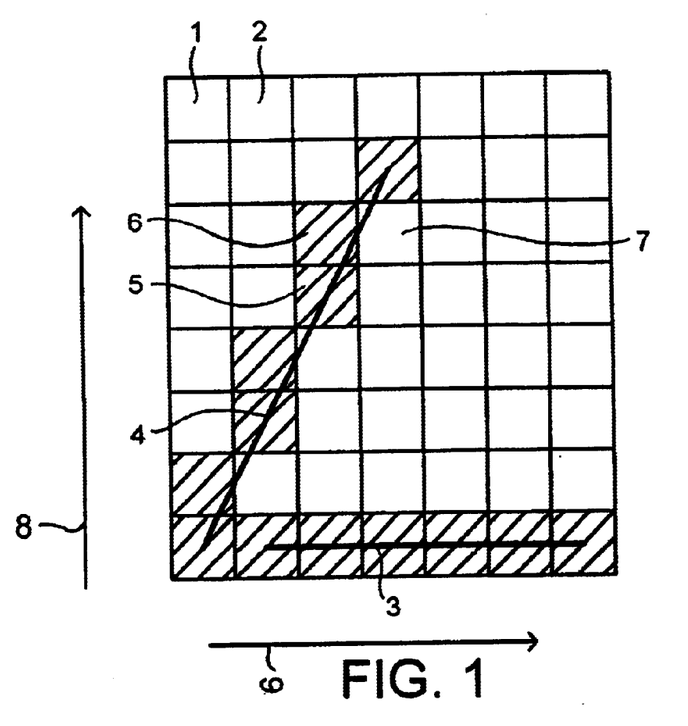
FIG. 1 shows a grid of pixels which can be illuminated to display lines.

One example is in the displaying of lines on a VDU. This commonly happens in graphics applications. FIG. 1 illustrates a grid of pixels 1,2, etc. and a pair of lines 3,4 which are to be displayed by illuminating certain ones of the pixels. The shaded pixels are illuminated to display the lines. Line 3 presents no problems because it lies neatly along a line of pixels, passing through the centre of each one. However, line 4 lies across the lines of pixels, and when this line is displayed there is a need to digitise the continuous nature of the line by choosing the pixels that best represent the line's absolute position. Some pixels (e.g. pixel 5) are easily chosen because the line 4 passes entirely through them. However, where the line passes partially through a pair of adjacent pixels (e.g. pixels 6 and 7) there is a need to decide which of those pixels should be illuminated.

A commonly used algorithm for digitising line segments, in this context is Bresenham's algorithm (see Jack Bresenham, 1965, "Algorithm for Computer Control of a Digital Plotter", IBM Systems Journal 4(1), 25–30; reprinted in Interactive Computer Graphics, Qd. H Freeman, IEEE Computer Society, 1980). This algorithm involves stepping pixel-by-pixel along the major axis of the line (for line 4 in FIG. 1 this is in the direction marked by arrow 8) and keeping track of the fractional error between the current pixel (i.e. a digitised position) and the continuous position of the line. The fractional error is stored as a variable known as the discriminator, which is updated at each step of the algorithm along the major axis. The fractional error is kept within ±0.5 pixels by testing the discriminator at each step; if the error is too large then a jump of one pixel is also made along the minor axis of the line (arrow 9 in FIG. 1) and the fractional error reset accordingly. There are equivalent algorithms for similar applications such as plotting curved lines and texture mapping and shape filling (where the stepping is generally used to find the ends of lines used to fill a shape).

Modem graphics applications place a high demand on processing power and there is therefore a need to streamline the processing of graphics algorithms as much as possible. The same considerations apply to other fields where digitised data has to be output.

SUMMARY OF THE INVENTION

According to one aspect of the present invention there is provided a method for generating a series of digitised control values for an output device to represent a continuous series of source data, comprising the steps of: storing in a single register a first digitised control value and an indication of deviation between that value and the source data; and repeatedly adding an increment to the register to generate a further digitised control value and simultaneously update the indication of deviation.

Each further digitised control value, generated at a respective repetition, suitably represents a respective further source data point. The indication of deviation updated for a control value preferably represents the deviation between that control value and a respective source data point.

The register preferably comprises a first set of adjacent bits holding the control value and a second set of adjacent bits holding the indication of deviation. Most preferably the bits of the second set of bits, are the most significant bits of the register and/or act to indicate the sign of the register. The indication of deviation suitably represents the cumulative deviation of the control values from the source data. The indication of deviation may represent a discriminator.

The increment preferably comprises a first portion for incrementing the control value and a second portion for incrementing the indication of deviation. (The word "incrementing" should not be read to be restricted to positive incrementing, but also to include incrementing with a negative value, and the word "increment" should be read accordingly). As will be explained in more detail below, at each repetition of the adding step the increment may suitably be selected from at least two values or may suitably be generated by a process capable of generating at least two values. In each case, there are preferably just two values. Most preferably one of these increment values is only used when the indication of deviation indicates an excessive deviation, otherwise preferably the other ("normal") increment value is used.

The step of adding an increment may preferably be divided, at least nationally, into three stages: determining whether the previously-updated indication of deviation is excessive, selecting/generating an increment value accordingly, and adding that increment value to the register (suitably so as to accumulate the total deviation for the process so far).

To determine whether the previously-updated indication of deviation is excessive it is preferably compared with a predetermined value; then one increment value is preferably selected if the indication of deviation is greater (or, in an alternative embodiment, less) than the predetermined value, and otherwise the other increment value is selected. The predetermined value suitably represents a deviation of greater than half of the digitisation resolution of the output device. Preferably the numeric value of the indication of deviation is offset from the true deviation, suitably so as to facilitate determining whether it is excessive. For instance, the numeric value may be offset by half (or approximately half of the digitisation resolution, suitably so that the numeric value of the predetermined value may be zero. This is especially preferable when the indication of deviation represents the sign of the register—then the sign of the register itself can be tested to determine whether the indication of deviation represents an excessive deviation.

To generate an increment value the increment value may be chosen from predetermined increment values. Alternatively it may be generated. One method for generating the increment value is by a masking operation. A mask may be generated as a function of the indication of deviation. This may, for example, be a bit shift function. The mask can preferably take one of two values, one having a string of zeros (or unset bits) and the other having a string of ones (or set bits). The increment may be generated by masking a predetermined increment value with the mask.

According to a second aspect of the present invention there is provided a hardware implementation of means adapted to carry out the above method. For example, according to the second aspect of the invention there is provided a computer comprising: processing means; a data memory comprising storage registers; a program memory for storing a set of instructions for the processor to generate a series of digitised control values for an output device to represent a continuous series of source data by storing in a single register a first digitised control value and an indication of deviation between that value and the source data, and repeatedly adding an increment to the register to generate a further digitised control value and simultaneously update the indication of deviation; and output means for supplying the digitised control values to the output device.

There are numerous specific applications of the method and apparatus according to the aspects of the present invention. For example, the output device may be a video display device/unit or a printer or a plotter. Each of these suitably provides a plurality of pixels or other discrete locations at which data can be displayed. The locations preferably lie on a grid, suitably an orthogonal grid. The grid is suitably in two or three dimensions. The control values preferably provide for controlling activation of pixels/locations of the output means.

The source data preferably represents graphical information. In this case, where there are two available increment values, preferably one represents an increment in one direction and the other represents an increment in another direction, which is preferably normal to the said one direction. The source data preferably represents one or more lines (straight or curved) to be displayed by the output device. The method preferably implements (or provides part of an implementation of Bresenham's algorithm.

The method described above, as such and/or as provided for in the second aspect of the invention, is preferably implemented by a data processing means. A number of measures are available to enhance the processing of the method. First, for speed of processing, the step of repeatedly adding an increment to the register is preferably stored as a set of instructions for a data processing apparatus and that set of instructions preferably includes no branch instructions (e.g. jump-type instructions), most preferably no conditional branch instructions. Second, the register may be of a type that can be subject to packed and non-packed instructions, i.e. instructions that treat the register as being composed of sub-units (e.g. objects) and instructions that treat the register as a whole. For example, the operation of adding an increment to the register is suitably performed by a packed adding operation. Preferably one of the steps of determining whether the previously-updated indication of deviation is excessive and adding the increment value to the register is provided by a non-packed instruction and the other by a packed instruction. One or more of the instructions are preferably capable of being executed by dedicated apparatus (software or hardware) in the computer.

The length of the register is preferably 32, 64 or 128 bits.

BRIEF DESCRIPTION OF THE DRAWINGS

The present invention will now be described by way of example with reference to the accompanying drawings in which.

DETAILED DESCRIPTION OF THE PREFERRED EMBODIMENT

Figure 2:
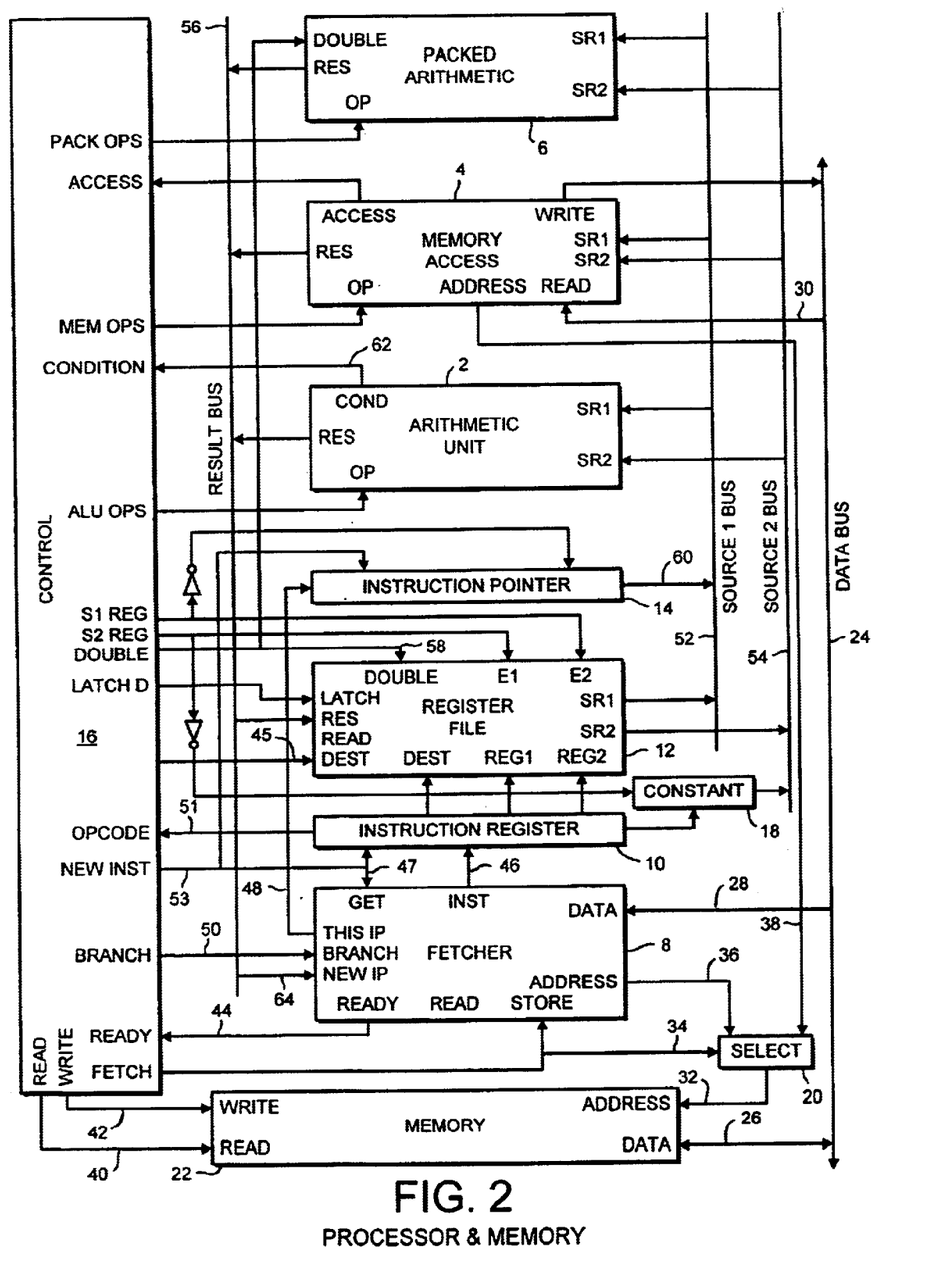
FIG. 2 is a block diagram of a processor and memory of a computer.

FIG. 2 shows a processor in accordance with one embodiment of the present invention. The processor has three execution units including a conventional arithmetic unit 2 and a memory access unit 4. In addition there is a packed arithmetic unit 6. The processor also includes an instruction fetcher 8, an instruction register 10, a register file 12 and an instruction pointer 14, all of which operate under the control of a control unit 16 of the processor. The register file comprises a set of registers each having a predetermined bit capacity and each being addressable with a single address. It is not possible to address individual locations within a register. When a register is accessed, the entire contents of the register are concerned. The processor further includes a constant unit 18 and a select unit, 20. The constant unit 18 and select unit 20 are also operated under the control of the control unit 16. The processor operates, in conjunction with a memory 22 which holds instructions and data values for effecting operations of the processor. Data values and instructions are supplied to and from the memory 22 via a data bus 24. The data bus 24 supplies data values to and from the memory 22 via a memory data input 26. The data bus 24 also supplies data to the instruction fetcher 8 via a fetcher data input 28 and to the memory access unit 4 via a memory access read input 30. The memory is addressed via the select unit 20 on address input 32. The select unit 20 is controlled via a fetch signal 34 from the control unit 16 to select an address 36 from the fetcher 8 or an address 38 from the memory access unit 4. Read and write control lines 40,42 from the control unit 16 control read and write operations to and from the memory 22. The instruction fetcher 8 fetches instructions from the memory 22 under the control of the control unit 16 as follows. An address 36 from which instructions are to be read is provided to the memory 22 via the select unit 20. These instructions are provided via the data bus 24 to the fetcher, data input 28. When the instruction fetcher has fetched its next instruction, or in any event has a next instruction ready, it issues a Ready signal on line 44 to the control unit 16. The instruction that is to be executed is supplied to the instruction register 10 along instruction line Inst 46 and held there during its execution. The instruction pointer 14 holds the address of the instruction being executed supplied to it from the fetcher 8 via instruction pointer line 48. A Get signal 47 responsive to a New Inst signal 53 from the control unit 16 causes the instruction register 10 to store the next instruction on Inst line 46 and causes the fetcher 8 to prepare the next instruction. The New Inst signal 53 also causes the instruction pointer 14 to store the address of the next instruction. A branch line 50 from the control unit 16 allows the instruction fetcher 8 to execute branches.

The instruction register 10 provides Source 1 and Source 2 register addresses to the register file 12 as Reg1 and Reg2. A result register address is provided as Dest. Opcode is provided to the control unit 16 along line 51. In addition, some instructions will provide a constant operand instead of encoding one or both source registers. The constant is provided by the constant unit 18. The instruction's source values are provided on Source 1 and Source 2 buses 52,54 by the appropriate settings of the S1 Reg and S2 Reg signals at inputs E1,E2. The correct execution unit is enabled by providing the appropriate values for Pack Ops, Mem Ops and ALU Ops signals from the control unit 16 in accordance with the Opcode on line 51. The enabled unit will normally provide a result Res on a result bus 56. This is normally stored in the selected result register Dest in the register file 12. There are some exceptions to this.

Some instructions provide a Double length result. These store the first part of the result in the normal way. In a subsequent additional stage, the second part of the result is stored in the next register in the register file 12 by asserting a Double signal 58. Branches 50 need to read and adjust the instruction pointer 14. These cause the S1 Reg signal not to be asserted, and so the instruction pointer 14 provides the Source 1 value on line 60. The Source 2 value is provided in the normal way (either from a register in the register file 12, or the constant unit 18). The arithmetic unit 2 executes the branch calculations and its result is stored into the fetcher 8 on the New IP input 64, rather than the register file 12, signalled by the Branch line 50 from the control unit 16. This starts the fetcher from a new address.

Conditional branches must execute in two stages depending on the state of condition line 62. The first stage uses the Dest Register as another source, by asserting a Read Dest signal 45. If the condition is satisfied, then the normal branch source operands are read and a branch is executed.

Calls must save a return address. This is done by storing the instruction pointer value in a destination register prior to calculating the branch target.

The computer described herein has several noteworthy general qualities.

Source operands are always the natural word length. There can be one, two or three source operands.

The result is always the natural word length, or twice the natural word length. There is a performance penalty when it is twice the natural word length as it takes an extra stage to store and occupies two, rather than one, registers. For this computer, assume a natural word length of 64 bits. That is, each register in the register file has a predetermined capacity of 64 bits.

The execution units 2,4,6 do not hold any state between instruction execution. Thus subsequent instructions are independent.

Non-Packed Instructions

The arithmetic unit 2 and memory access unit 4, along with the control unit 16 can execute the following instructions of a conventional instruction set. In the following definitions, a register is used to denote the contents of a register as well as a register itself as a storage location, in a manner familiar to a person skilled in the art.

mov8 Move a constant or a register into a register.

add8 Add two registers together and store the result in a third register (which could be the same as either of the sources)

sub8 Subtract two registers and store the result in a third register store1 Use one register as an address and store the contents of another register into memory at the location specified by the address jumpgez Jump to a new program location, if the contents of a specified register is greater than or equal to zero shr8s Perform a bitwise right shift of a register by a constant or another register and store the result in a destination register. The shift is signed because the sign bit is duplicated when shifting and8 Perform a bitwise logical and operation on two registers and store result in destination register.

There are other instructions which, for brevity, are not described here.

Packed Unit

Figure 3:
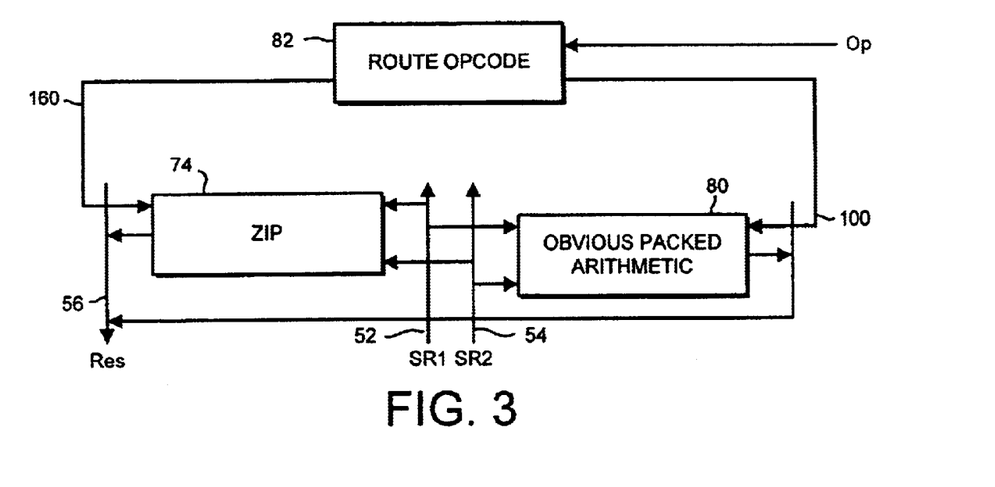
FIG. 3 is a block diagram of a packed arithmetic unit.

FIG. 3 shows in a block diagram the packed arithmetic unit 6. This is shown as a collection of separate units each responsible for some subset of packed arithmetic instructions. Another implementation could combine the functions in different ways. The units include a zip unit 74 and an obvious packed arithmetic unit 80. These are operated responsive to a route opcode unit 82 which selectively controls the zip unit 74 and the arithmetic unit 80 using the opcodes on lines 160 and 100 respectively. Operands for the zip unit 74 and arithmetic unit 80 are supplied along the Source 1 and Source 2 buses 52, 54. Results from the zip and arithmetic units are supplied to the result bus 56. The op input to the route opcode unit 82 receives the Pack Ops instruction from the control unit 16 (FIG. 2). It will be appreciated that the operands supplied on the Source 1 and Source 2 buses are loaded into respective input buffers of the zip and arithmetic units and the results supplied from one or two output buffers to one or two destination registers in the register file 12.

Obvious Packed Arithmetic

The obvious packed arithmetic unit 80 performs operations taking the two source operands as containing several packed objects each and operating on respective pairs of objects in the two operands to produce a result also containing the same number of packed objects as each source. The operations supported can be addition, subtraction, comparison, multiplication, left shift, right shift etc. As explained above, by addressing a register using a single address an operand will be, accessed. The operand comprises a plurality of objects which cannot be individually addressed.

Figure 4:
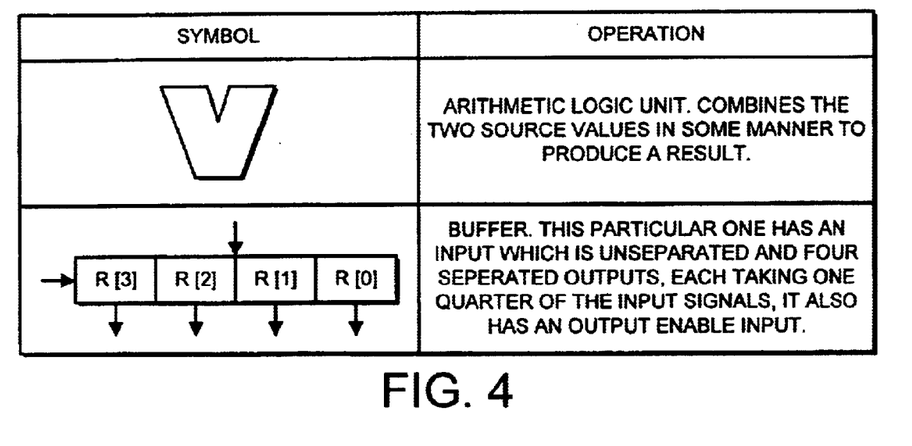
FIG. 4 shows the meaning of symbols used in the figures.

FIG. 4 shows the symbols used in the diagrams illustrating the arithmetic units of the packed arithmetic unit 6.

Figure 5:
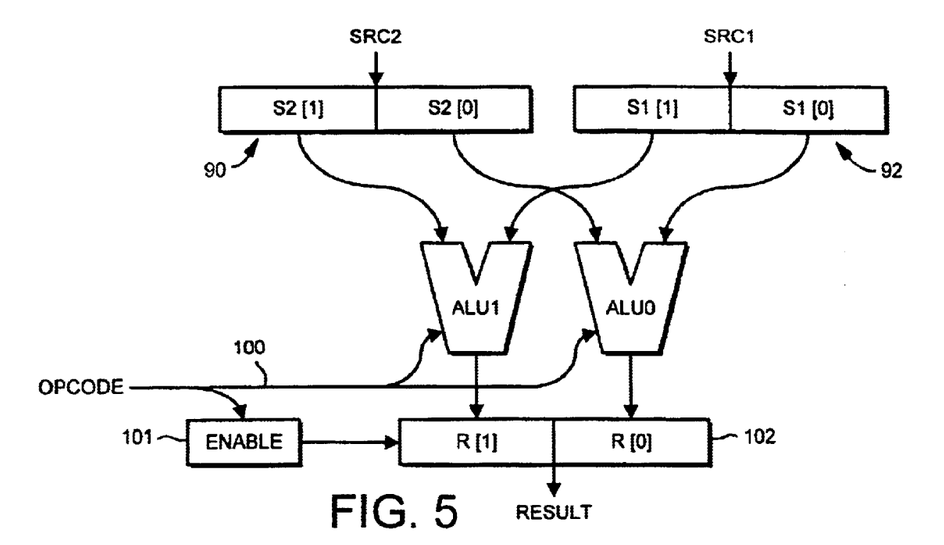
FIG. 5 is a block diagram of an obvious packed arithmetic unit operating on two packed source operands.

FIG. 5 shows an obvious packed arithmetic unit which can perform addition, subtraction, comparison and multiplication of packed 16-bit numbers. As, in this case, the source and result bus widths are 32-bit, there are two packed objects, each 16 bits long, on each bus. The packing of the 16-bit numbers achieves the storage of two objects in a single register, stored as successive strings of bits in that register.

The obvious packed arithmetic unit 80 comprises two arithmetic logical units ALU0–ALU1, each of which are controlled by opcode on line 100 which is derived form the route opcode unit 82 in FIG. 3. The 32-bit word supplied from source register 1 SRC1 contains two packed objects S1[0]–1[1]. The 32-bit word supplied from source register 2 SRC2 contains two packed objects S2[0]–S2[1]. These are stored in first and second input buffers 90,92. The first arithmetic logic unit ALU0 operates on the first packed object in each operand, S1[0] and S2[0] to generate a result R[0]. The second arithmetic logic unit ALU1 similarly takes the second pair of objects and provides a respective result R[1]. These are stored in a result buffer 102. The result word thus contains two packed objects. An enable unit 101 determines if any of the units should be active and controls whether the output buffer asserts its output.

The instructions are named as follows:

add4p Add each respective S1[i] to S2[i] as 2's complement numbers producing R[i]. Overflow is ignored.

sub4p Subtract each respective S2[i] from S1[i] as 2's complement numbers producing R[i]. Overflow is ignored.

The suffix "4" indicates an instruction for 32-bit objects. It is assumed that the same set of operations is provided for packed 8-bit and packed 16-bit objects, with similar names but replacing the "4" with a "1" or a "2".

The suffix "s" in an instruction indicates that a signed operation is to be performed. The suffix "us" indicates that an operation is unsigned.

The suffix "p" in an instruction indicates that a packed operation is to be performed. Otherwise the operation is unpacked.

Zip

There are three kinds of restructuring operations executed by the zip unit 74. These are:

Shuffle (zip) This takes a source string consisting of pairs of object strings and interleaves the objects from the object string pairs to produce a single resultant string of the same length as the source string. This is a perfect shuffle.

Sort (unzip) This takes a source string containing object pairs and de-interleaves the pairs to produce a result string consisting of the concatenation of the de-interleaved pairs. This is a perfect sort.

Transpose (flip) This takes a source string containing object quadruples and produces a result string by exchanging appropriate source objects to affect a set of matrix transposes.

Any one of these operations can alternatively be constructed from suitable combinations of the other two operations.

For all these transformations the source string consists of a number of vectors, each containing the same number of equally sized objects. To name these transformations requires three numbers.

number of vectors This specifies the number of vectors in the source and result strings.

size of vector This specifies the number of objects in each vector.

size of object This specifies the number of bits in each object.

The instruction names consist of a transform type (zip, unzip, flip), followed by the number of vectors suffixed by an "n", The size of each vector suffixed by a "v" and the object size expressed as a number of 8-bit bytes suffixed by a "p". Thus, in the instruction zip4n2v1pl, zip denotes the instruction type, and the 4n2v1pl specifies the operand format. In this case a zip operation is to be executed on 4 vectors each of two one-byte objects. To do this particular operation, as each zip requires two vectors, two separate zips are done.

Figure 6:
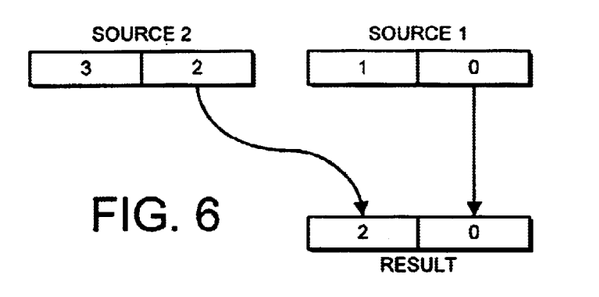
FIG. 6 illustrates one zip restructuring operation.
Figure 7:
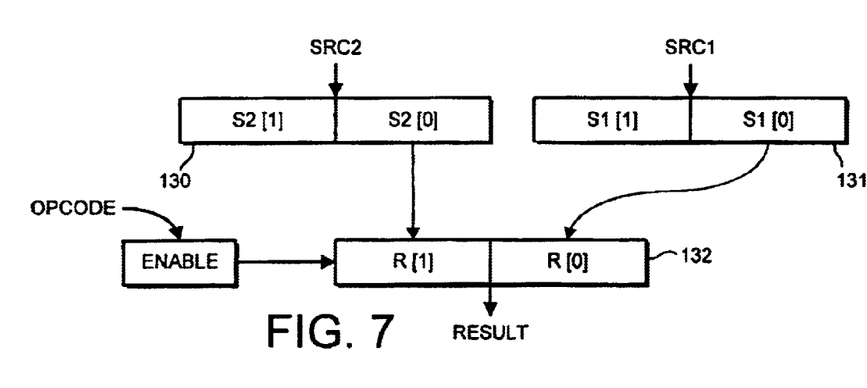
FIG. 7 shows part of the zip unit for performing the zip operation.

When the source and result strings are 64 or 128 bits in total there are 9 unique zip and unzip transforms. One of these is zip2n2v4pl, which is illustrated in FIG. 6. The suffix "l" indicates that the low part of the result is taken. FIG. 7 shows the part of the zip unit that deals with this instruction. Two vectors SRC1 and SRC2, each of two 4-byte objects S2[1], S2[0], S1[1] and S1[0] are supplied to input buffers 130 and 131. When the opcode for the zip2n2v4pl instruction is received it enables the supply of a result from the output buffer 132, which takes as object R[1] the value of input object S2[0] and takes as object R[0] the value of input object S1[0].

As an example of an application to which the computer may be put, an implementation of Bresenham's algorithm will now be described. As explained above, Bresenham's algorithm is used in drawing line segments on, for example, a VDU.

Figure 8:
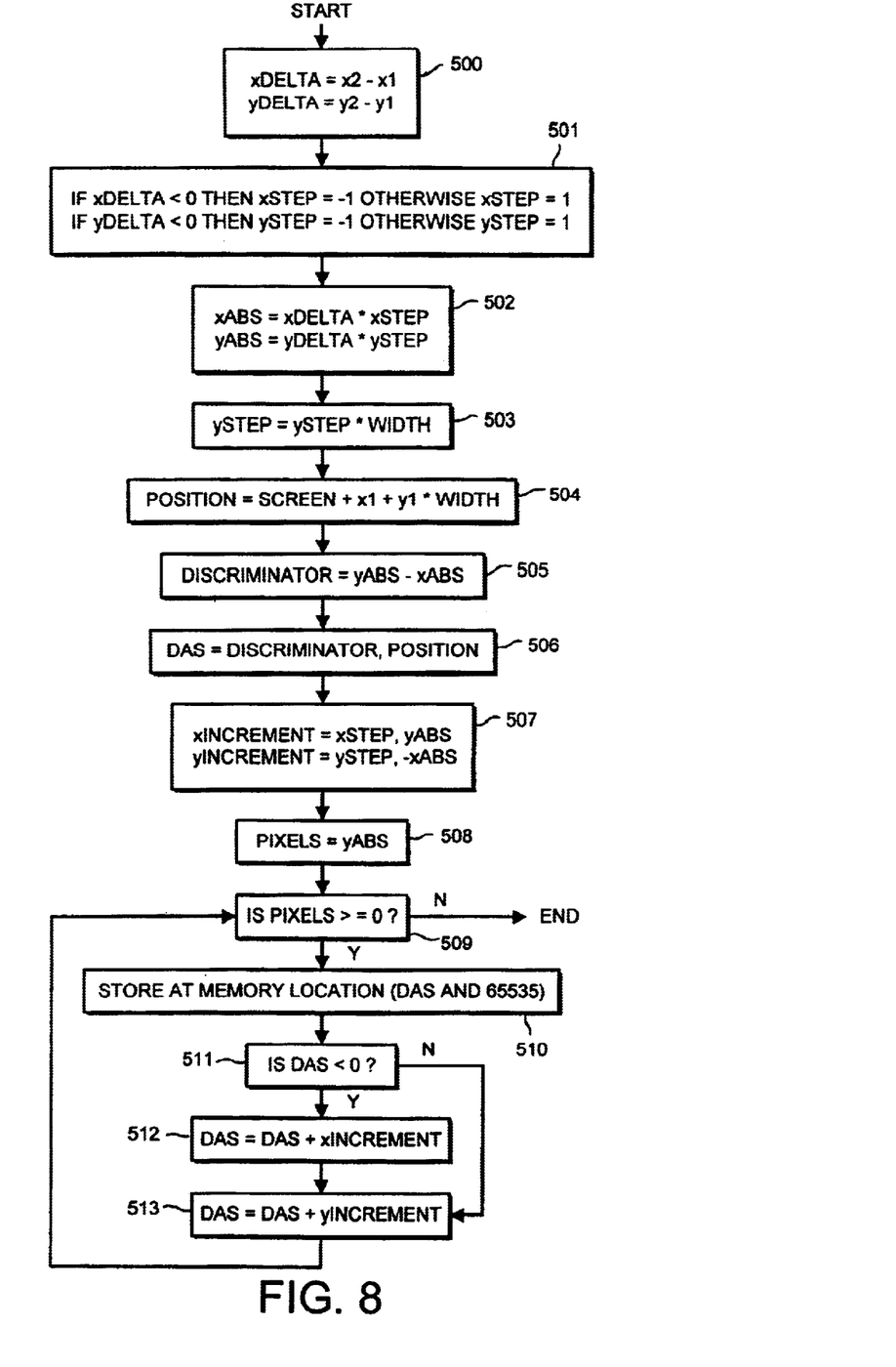
FIG. 8 illustrates the flow of a method for implementing Bresenham's algorithm.

FIG. 8 is a flow diagram illustrating the implementation. The implementation of FIG. 8 plots a line segment on a VDU having pixels arranged along orthogonal x and y axes. The VDU is controlled in the normal way from video memory, which in the implementation of FIG. 8 starts at a memory address that is held in the variable screen. There is one memory address per pixel and the width of the screen in pixels is held in the variable width. The screen is mapped by rows and then columns into its memory space. Therefore, stepping by one memory address moves by one pixel along a row and stepping by width memory addresses moves by one pixel along a column.

The line segment extends from position (x1,y1) to position (x2,y2). For simplicity it is assumed that the major axis of the line is along the y axis, i.e. that the absolute value of x2–x1 does not exceed the absolute value of y2–y1. (A simple substitution could be used to apply the process to line segments having the x axis as their major axis).

In this embodiment 64-bit registers are used.

At step 500 the variables xDelta and yDelta are assigned to the differences between the x and y co-ordinates respectively of the end points of the line.

At step 501 the variables xStep and yStep are assigned to −1 or 1 depending on the sign of the corresponding xDelta or yDelta variable.

At step 502 the variables, xAbs and yAbs are assigned to the absolute values of the corresponding xDelta or yDelta variable by multiplying that variable by the corresponding xStep or yStep variable.

At step 503 the variable yStep is adjusted to equal the difference in memory addresses in the y direction between the upper and lower ends of the line. This is done by multiplying the previous value of yStep by width. The variable xStep already equals the difference in memory addresses in the x direction between the right and left ends of the line because the screen is mapped by rows and then columns into its memory space.

At step 504 the memory address corresponding to the first end of the line, (x1,y1) is calculated and stored in position.

At step 505 a starting value of the discriminator is calculated and stored in discriminator. The discriminator is held as an integer rather than a fraction. This simplifies the process, as will be shown below.

At step 506 a single variable, DAS, is assigned to hold the present screen position (as a memory address) and the present value of the discriminator. In this implementation the variable DAS is a 32-bit variable, but other sizes could be used provided they could hold the necessary information. The screen position is stored in a consecutive group of the least significant bits of DAS and the discriminator is stored in a consecutive group of the most significant bits of DAS. The computer described above is adapted to hold conveniently variables that include more than one item of data. However, in general the same effect can easily be achieved by other means—for example, if position and discriminator are 16-bit variables then DAS could be set to equal position+ discriminator*$2^{16}$. For simplicity FIG. 8 adopts a convention of indicating this form of assignment by separating with a comma the two items that are being assigned.

At step 507 variables xIncrement and yIncrement are assigned to hold the values needed to increment both the present screen position and the discriminator for a step of Bresenham's algorithm in the x and y directions respectively. Since the y axis is the major axis of the line the discriminator is to be incremented by the value of xAbs for a step in the y direction, whereas the discriminator is to be incremented by negative yAbs (i.e. it is to be decremented by the value of yAbs) for, a step in the x direction.

Step 509 sets up a loop to step along each row of the display along the major axis of the line by using counter variable pixels. This allows steps 510 to 513 to be repeated accordingly.

Step 510 causes a pixel of the line to be drawn by making an assignment to the memory address at the address indicated by the present screen position as stored in the least significant 16 bits of DAS. The least significant 16 bits of DAS can be extracted by, for example, ANDing DAS with a mask—in this case with the value $2^{16}-1$.

Steps 511 to 513 effect the simultaneous incrementing of both the present screen position and the discriminator. A check is made at 511 to find whether the discriminator is negative. Since the discriminator is stored in the most significant bits of DAS, and the most significant bit of DAS indicates its sign, this can be achieved simply by testing the sign of the entire variable DAS. If the discriminator is negative then a step along the x axis is made at 512, by adding together DAS and xIncrement. At 513 a step along the y axis is made, by adding together DAS and yIncrement. Because DAS, xIncrement and yIncrement all contain portions relevant to the screen position and the discriminator there is no need to update the screen position and the discriminator separately.

The loop steps are repeated until the major axis of the line has been traversed.

The following assembly code provides an implementation of this method for the computer described above. For simplicity, code is only shown for steps 506 to 513 of FIG. 8. The numbers preceding the instructions of the code show the steps of FIG. 8 to which they correspond.

| 506 | zip2v4pl | DAS, position, discriminator |
| --- | --- | --- |
| 507 | sub4s | temp, 0, xAbs |
| 507 | zip2v4pl | xIncrement, yStep, temp |
| 507 | zip2v4pl | yIncrement, xStep, yAbs |
| 508 | mov | pixels, yAbs |
|  | loop: |  |
| 509 | sub4s | pixels, pixels, 1 |
| 510 | add4us | temp, DAS, 0 |
| 510 | store1 | color, temp, 0 |
| 511 | jumpgez | DAS, skip |
| 512 | add4p | DAS, DAS, xIncrement |
|  | skip: |  |
| 513 | add4p | DAS, DAS, yIncrement |
| 509 | jumpgez | pixels, loop |

The instruction "zip2v4pl" is used to combine the two component parts when assigning the variables DAS, xIncrement and yIncrement. 4-byte packed adds (indicated by the suffix "4p" in the instructions) are used to add the variables together to increment both parts at once. The instruction "add4us" is used to extract the current screen position's memory address from DAS so that it can be used in the following instruction, where a value color, representing a chosen colour, is stored in the screen memory at that address. The instruction "jumpgez" (jump if greater than or equal to zero) is used to test the sign of DAS.

The state of the branching instruction at step 511 is not easily predictable. Therefore, the code set out above will not make optimal use of a processor that use branch prediction. The following code performs the same function but eliminates the need for a branch instruction.

| zip2v4pl | DAS, position, discriminator |
| --- | --- |
| sub4s | temp, 0, xAbs |
| zip2v4pl | xIncrement, yStep, temp |
| zip2v4pl | yIncrement, xStep, yAbs |
| mov | pixels, yAbs |
| loop: |  |
| sub4s | pixels, pixels, 1 |
| add4us | temp, DAS, 0 |
| store1 | color, temp, 0 |
| shr8s | mask, DAS, 63 |
| and | cross, xIncrement, mask |
| add4p | DAS, DAS, cross |
| add4p | DAS, DAS, yIncrement |
| jumpgez | pixels, loop |

In this implementation the right shift instruction shr8s is used to produce a mask variable, mask, which replicates the sign bit of the variable DAS (i.e. the sign of the discriminator part of that variable) to make the contents of mask all ones or all zeros. This is ANDed with xIncrement to produce a variable cross. If the discriminator portion of DAS is negative then mask is all ones and cross equals xIncrement; otherwise cross equals zero. The variable cross is then added to DAS, as is yIncrement.

In this implementation the loop has one extra step. However, because there is no branching in the loop the process flow is more predictable and the loop is likely to run faster on a processor that has branch prediction. In systems that provide scheduling or parallel processing a further speed increase might also be provided by moving the step "add4p DAS, DAS, yIncrement" back one place (or, if the same variable is used for cross and mask, back two places) so that it separates from each other the instructions that use that variable.

The techniques described above could be employed in other situations where there is a need for step-wise quantisation of continuous values (or values that are effectively continuous, e.g. where already-quantised values are being re-quantised on a new basis) and accumulation of fractional error. For example, the same principles could be extended for use in triangle rendering, plotting curved lines, for instance ellipses or segments of ellipses, or shape filling or texture mapping, where a shape (usually a triangle) is generally filled by means of a series of solid or texture-mapped lines which each extend from one boundary of the shape to the opposite boundary.

In the computer described above the variables that hold two types of information, i.e. DAS, xIncrement and yIncrement, can each be held in a respective register. The two component items of information can then be treated as a pair of objects in each register, with the objects of each pair holding dissimilar types of information. It should be noted that in the process described above, if the contents of DAS are stored as a pair of objects in a single register, one of the objects is used to control (by means of the test at step 511) the actions performed on the other (e.g. at step 512).

In plotting curves similar problems arise. Taking a circle as an example, the problem may be analysed with reference to just one octant, say the uppermost right octant where for the equation $r^2=x^2+y^2$ defining the circle $x \geq 0$ and $y \geq x$. As one progresses around the circle, the error is $e_i = r^2 - x_i^2 - y_i^2$, where $x_i = x_{i-1}+1$. The error is positive when the plotting position is inside the true location of the circle and negative when outside. To digitise the location of the circle then for each $x_i$ a corresponding $y_i$ must be picked with the smallest value of $/e_i/$—the choice is between $y_{i-1}$ and $(y_{i-1}+1)$. The expression $e_{i+1} = r^2 - (x_i+1)^2 - (y_i-s)^2$, where s represents the value of the step in the y-direction (so a straight step has s=0 and a diagonal step has s=1), can be expanded to give $e_{i+1}=e_i-2x_i-1+2sy_i-1$. Taking a straight step makes the error more negative and taking a diagonal step makes it more positive, provided $y_i>x_i+1$. This last condition shows when an octant of the circle has been terminated.

In implementing this, it is again useful to bias the error so that a simple sign test can be used to distinguish the two choices. Concentric circles half a pixel larger or smaller in diameter have an error of r±0.25 pixels at a circumferential point. Therefore, an initial error of r can be introduced to allow the sign of e to be used to determine whether to use a straight or a diagonal step.

The following code shows how the plotting of a circle can be implemented using the computer described above. The code plots the uppermost two octants and the lowermost two octants of the circle. The remaining four octants may be plotted by swapping the x and y variables in the algorithm.

```
mov      plusx, 0
mov      minusx, 0
mov      error, r
mul4us   y2, r, 2
sub4us   y2, 1
mov      x2, 1
mul4us   temp, y, width
add4us   temp, temp, x
add4us   screen, screen, temp
mul4us   y, r, width
zip4pl   errory, y, error
sub4s    temp, 0, width
zip4pl   y2width, temp, y2
zip4pl   x2space, 0, x2
zip4pl   upper2, 0, 2
loop:
add4us   top, screen, erroy
sub4us   bottom, screen, errory
store1   color, top, plusx
store1   color, top, minusx
store1   color, bottom, plusx
store1   color, bottom, minusx
add4s    plusx, plusx, 1
sub4s    minusx, minusx, 1
add4ps   errory, errory, x2space
add4ps   x2space, x2space, upper2
jumpgez  skip, errory
add4ps   errory, errory, y2width
sub4ps   y2width, y2width, upper2
skip:
sub8s    temp, y2width, x2space
jumpgez  loop, temp
```

Initially, r holds the radius of the circle, x and y hold the co-ordinates of the centre of the circle, screen holds the lowest address of video memory and width holds the width of the screen in memory addresses. The first 10 lines of the code carry out preliminary assignments to define the variables used in the body of the algorithm, setting plusx and minusx to zero, error to the value of r, y2 to (2*r−1), x2 to 1, screen to (screen+x+y*width) and y to (r*width).

In plotting the circle, the variables plusx and minusx are used as offsets in the x-direction, to differentiate between the octants to the right and left of the centre-line of the circle, and the variables top and bottom as offsets in the y-direction, to differentiate between the upper and lower pairs of octants.

As in the code above for plotting a straight line, a single register, errory, is used to hold both the current y position and the discriminator. The instruction "add4ps errory, errory, x2space" increments the bits of error that hold the discriminator, so as to update the value of the discriminator. The instruction "add4ps errory, errory, y2width" increments the bits of errory that hold the current y position so as to make a step in the y direction, and updates the discriminator accordingly by also incrementing the bits of errory that hold the discriminator. Since the discriminator was initially offset by r and since the sign of the discriminator determines the sign of errory, the branch instruction "jumpgez skip, errory" is very simple.

The branch instruction "jumpgez skip, errory" could be eliminated by replacing the last six lines of the code with the following:

```
shr8s     mask, errory, 63
and8      temp1, y2width, mask
add4ps    errory, errory, temp1
and8      temp2, upper2, mask
sub4ps    y2width, y2width, temp2
sub8s     temp, y2width, x2space
jumpgez   loop, temp
```

These lines make use of the right shift instruction (here "shr8s mask, errory, 63") to replicate the sign bit of errory (which represents the sign of the discriminator). This is ANDed with y2width to produce a value for temp1 which is used to increment errory.

Instead of a VDU the procedures above could, with suitable adaptation, provide output to printers, plotters etc. The computer described above, equipped with means for performing the methods described, could find uses especially in graphically-intensive applications, for example games consoles: video cards, set-top boxes, video decoders, flight simulators etc.

The present invention may include any feature or combination of features disclosed herein either implicitly or explicitly or any generalisation thereof irrespective of whether it relates to the presently claimed invention. In view of the foregoing description it will be evident to a person skilled in the art that various modifications may be made within the scope of the invention.

What is claimed is:

1. A method for generating a series of digitised control values for an output device to represent a continuous series of source data, comprising the steps of:

storing in a single register a first digitised control value and a second value indicating a deviation between the first value and the source data; and repeatedly adding a single incrementing value to the register to generate a further digitised control value and simultaneously update the second value indicating the deviation;

wherein the single incrementing value comprises a first portion for incrementing the control value and a second portion for incrementing the second value indicating the deviation.

2. A method as claimed in claim 1, wherein the register comprises a first set of adjacent bits holding the control value and a second set of adjacent bits holding the second value indicating the deviation.

3. A method as claimed in claim 2, wherein the second set of bits are the most significant bits of the register.

4. A method as claimed in claim 1, wherein the increment is of a third value if the second value indicating the deviation is less than a predetermined value, and otherwise the increment is of a fourth value.

5. A method as claimed in claim 1, wherein the step of adding an increment comprises determining whether the second value indicating the deviation is greater or less than a predetermined value, and the increment that is added to the register depends on the result of that determination.

6. A method as claimed in claim 4, wherein the predetermined value is 0.

7. A method as claimed in claim 4, wherein the step of adding an increment comprises generating a mask as a function of the second value indicating the deviation and generating the increment by masking a predetermined increment value with the mask.

8. A method as claimed in claim 1, wherein the output device is a video display device having a plurality of pixels at digitised positions.

9. A method as claimed in claim 8, wherein the digitised control values represent values for controlling activation of pixels of the display.

10. A method as claimed in claim 1, wherein the step of repeatedly adding, an increment to the register is stored as a set of instructions for a data processing apparatus and the set of instructions includes no branch instructions.

11. A process for performing Bresenhamt's algorithm comprising a method as claimed in claim 1.

12. A method as claimed in claim 1, wherein the second value indicating the deviation represents a discriminator.

* * * * *

UNITED STATES PATENT AND TRADEMARK OFFICE
CERTIFICATE OF CORRECTION

PATENT NO. : 6,903,750 B2 Page 1 of 1
APPLICATION NO. : 10/117308
DATED : June 7, 2005
INVENTOR(S) : Nathan Mackenzie Sidwell It is certified that error appears in the above-identified patent and that said Letters Patent is hereby corrected as shown below:

On the title page, item (56) should read:

(56) References Cited

U.S. PATENT DOCUMENTS 4,878,182 A * 10/1989 Aranda et al...........345/443
5,568,401 A * 10/1996 Narayanaswami.....345/522
5,371,839 A * 12/1994 Fukunaga et al.......345/589

Col. 14, claim 11, line 8 should read:
11. A process for performing Bresenham's algorithm Signed and Sealed this Fifth Day of February, 2008

JON W. DUDAS
*Director of the United States Patent and Trademark Office*